United States Patent
Isenmann et al.

(10) Patent No.: US 12,074,764 B2
(45) Date of Patent: Aug. 27, 2024

(54) SENSOR DEVICE FOR THE TRANSMISSION OF A SENSOR PARAMETERIZATION

(71) Applicant: VEGA Grieshaber KG, Wolfach (DE)

(72) Inventors: Andreas Isenmann, Haslach im Kinzigtal (DE); Florian Burgert, Gengenbach (DE); Volker Allgaier, Haslach im Kinzigtal (DE)

(73) Assignee: VEGA Grieshaber KG, Wolfach (DE)

( * ) Notice: Subject to any disclaimer, the term of this patent is extended or adjusted under 35 U.S.C. 154(b) by 132 days.

(21) Appl. No.: 17/632,470

(22) PCT Filed: Aug. 13, 2019

(86) PCT No.: PCT/EP2019/071668
§ 371 (c)(1),
(2) Date: Feb. 2, 2022

(87) PCT Pub. No.: WO2021/028023
PCT Pub. Date: Feb. 18, 2021

(65) Prior Publication Data
US 2022/0278893 A1 Sep. 1, 2022

(51) Int. Cl.
*H04L 67/00* (2022.01)
*H04B 5/00* (2024.01)
(Continued)

(52) U.S. Cl.
CPC ............ *H04L 41/084* (2013.01); *H04L 67/12* (2013.01); *H04W 4/38* (2018.02); *H04W 4/80* (2018.02)

(58) Field of Classification Search
CPC ....... H04L 41/084; H04L 67/12; H04L 67/34; H04W 4/38; H04W 4/80; H04B 5/0031
See application file for complete search history.

(56) References Cited

U.S. PATENT DOCUMENTS

| | | | |
|---|---|---|---|
| 6,978,294 B1 | 12/2005 | Adams et al. | |
| 7,610,354 B2 * | 10/2009 | Adams | H04L 67/34 709/224 |

(Continued)

FOREIGN PATENT DOCUMENTS

| | | |
|---|---|---|
| CN | 1735847 A | 2/2006 |
| CN | 109716073 A | 5/2019 |

(Continued)

OTHER PUBLICATIONS

International Preliminary Report on Patentability issued Feb. 24, 2022 in PCT/EP2019/071668, (submitting English translation only), 9 pages.

(Continued)

*Primary Examiner* — Chris Parry
*Assistant Examiner* — Hassan A Khan
(74) *Attorney, Agent, or Firm* — Oblon, McClelland, Maier & Neustadt, L.L.P.

(57) ABSTRACT

A sensor device for transmitting a sensor parameterization between sensors. The sensor device includes a first sensor with a sensor parameterization and a second sensor. The first sensor and the second sensor communicate with each other via a communication link. The first sensor sends the sensor parameterization to the second sensor via the communication link. The second sensor receives and accepts the sensor parameterization. The second sensor further provides the first sensor with the energy required to transmit the sensor parameterization via the communication link.

15 Claims, 2 Drawing Sheets

(51) Int. Cl.
*H04L 41/084* (2022.01)
*H04L 67/12* (2022.01)
*H04W 4/38* (2018.01)
*H04W 4/80* (2018.01)

(56) References Cited

U.S. PATENT DOCUMENTS

| | | | |
|---|---|---|---|
| 11,405,760 B1* | 8/2022 | Lingle | H04W 4/026 |
| 2005/0206530 A1 | 9/2005 | Cumming et al. | |
| 2006/0047778 A1* | 3/2006 | Adams | H04L 67/125 |
| | | | 709/217 |
| 2007/0126570 A1* | 6/2007 | Kathan | H01R 13/6683 |
| | | | 340/533 |
| 2009/0288482 A1* | 11/2009 | Faist | G01F 23/808 |
| | | | 73/290 R |
| 2010/0268496 A1* | 10/2010 | Trebbels | G05B 19/0426 |
| | | | 702/189 |
| 2015/0120231 A1 | 4/2015 | Jagiella | |
| 2021/0236729 A1* | 8/2021 | Kiani | A61M 5/1723 |
| 2023/0210404 A1* | 7/2023 | Besser | G01D 11/30 |
| | | | 600/595 |

FOREIGN PATENT DOCUMENTS

| | | |
|---|---|---|
| DE | 20 2016 103 635 U1 | 10/2017 |
| DE | 20 2016 103 635 U1 | 11/2017 |
| DE | 10 2016 224 158 A1 | 6/2018 |
| WO | WO 2016042227 A1 | 3/2016 |

OTHER PUBLICATIONS

International Search Report and Written Opinion of the International Searching Authority issued Apr. 6, 2020 in PCT/EP2019/071668, (English translation previously filed), 14 pages.
International Search Report issued Apr. 6, 2020 in PCT/EP2019/071668 filed Aug. 13, 2019, 2 pages.
Office Action dated Mar. 27, 2024, issued in counterpart CN Application No. 201980098738.7, with English Translation, citing documents No. 1,2 and 15-17. (44 pages).

* cited by examiner

SENSOR DEVICE FOR THE TRANSMISSION OF A SENSOR PARAMETERIZATION

FIELD OF INVENTION

The invention relates to a sensor device for transmitting a sensor parameterization between sensors, a sensor for a sensor device, the use of a sensor, a method for transmitting a sensor parameterization between sensors, a program element, and a computer-readable medium.

BACKGROUND

If a battery-powered sensor is replaced with a new sensor, e.g. after the battery has been discharged, the new sensor must be set and configured in the same way as the previous sensor. The parameterization data of the previous sensor can, for example, be stored in one or more files on a computer and the new sensor can be connected to the computer and configured before delivery or installation. For this purpose, the new sensor must be connected, the corresponding parameterization data must be compiled, for example, from one or more databases and files, and the transfer process must be started. After a quality assurance check, which in particular ensures that the correct data has been transferred, the sensor can be disconnected from the computer and installed at the place of use.

SUMMARY

With embodiments of the present disclosure, an improved sensor device may be provided in an advantageous manner. For example, the sensor device may automatically take over the parameterization of a previous sensor from the new sensor while reducing or avoiding the steps mentioned above.

According to a first aspect, a sensor device for transmitting a sensor parameterization, a parameterization and/or a parameterization between sensors is provided. The sensor device comprises a first sensor with a sensor parameterization, and a second sensor. The first sensor and the second sensor are configured to communicate with each other via a communication link. The first sensor is configured to send the sensor parameterization to the second sensor via the communication link. The second sensor is configured to receive and accept the sensor parameterization. The second sensor is further configured to provide the first sensor with the energy required to transmit the sensor parameterization via the communication link.

By sensor is meant here an arrangement or device with a unit for the physical detection of the process variable, e.g. a physical sensor or a generator-receiver arrangement for e.g. ultrasonic waves or radar, as well as an electronic unit which provides at least the electrical power supply and which, depending on the application, for example electronically processes the detected process variable and makes it available as digital data. The electronic elements that can be used for this purpose, such as voltage regulators, voltage converters, protection circuits, analog-to-digital converters, filters, amplifiers, microprocessors, memory modules, signal generators, oscillators, radiators, piezo converters, etc., are known to the person skilled in the art. The term "device" is used synonymously with "sensor" in this disclosure when it is clear from the context that the device is a sensor.

The two sensors are, for example, battery-powered and of the same or similar type. The previous, i.e., the first sensor has no more battery charge and is to be replaced or exchanged by a new, i.e., the second sensor of the same or similar type. The sensor device now allows easy commissioning of the new sensor by transferring the device settings of the previous sensor with empty battery to the new sensor with full battery. The new sensor with full battery feeds the communication module of the previous sensor and receives the parameterization or parameterization data via the communication link.

Thus, the term "communication link" is to be understood in the present disclosure to mean not only the transmission of data, but also the transmission of the energy required for this purpose. Consequently, this is also to be understood to mean a connection in which data transmission takes place in accordance with, for example, a communication standard and energy transmission for data transmission which is not part of the communication standard.

According to one embodiment, a suitable communication link is a near field communication (NFC) link, in which the energy of the new sensor is transferred inductively and thus wirelessly to the old sensor.

According to one embodiment, the communication link is wired. For example, the communication link is a USB connection that can provide both power and data transmission. For this purpose, the sensors have appropriate hardware and software, as well as, for example, a plug connection on the housing that can withstand the environmental or ambient conditions, so that the connection is reliable and the sensor is not damaged by, for example, moisture or liquid penetration.

According to the above definition of the term "communication link", there may also be a mixed form of wireless and wired with regard to energy and data transmission. For example, the energy transmission is wireless via an induction technology and the data transmission via a wired communication standard or vice versa. The energy transmission does not necessarily have to be related to a standard for data transmission.

According to one embodiment, the communication connection may be a master-slave connection. The sensors are configured to be able to act as both master and slave. This ensures that a sensor with a full battery can read out the data via NFC from sensors with an empty battery, for example, as a master, but it is suitable as a slave for a further generation change.

In order to avoid unnecessary drain on the battery of the new sensor, polling of the NFC interface at the new sensor may be triggered by an external source. Therefore, in some embodiments, the second sensor is arranged to receive a signal to start the transmission. Signal in this context may mean, for example, an electronic signal, such as an "enable" signal from a digital circuit, a power supply that is turned on for a circuit, or a message or command that is processed by a logic circuit, such as a processor. According to one embodiment, the signal may be generated by, for example, a button on the sensor, a reed contact, or a Hall sensor, and may be triggered by a user at the sensor. If the sensor has a Bluetooth module or a cellular module, the signal can be received via the corresponding interface. Thus, a user can start the transmission via a Bluetooth connection with a smartphone or a tablet without any required authentication or, for example, by pressing a magnetic switch from the outside. The data from the old device is then completely transferred to the new sensor, via NFC. The new device then behaves exactly like the previous device and is instantly ready for operation. No further intervention by the operator and/or user is necessary. Instead of a Bluetooth connection, a wired or other wireless connection can also be applied.

In parallel, according to one embodiment, the parameterization information of the previous sensor can also be taken from a backup when the sensors have established the connection. By establishing the connection, for example, the authorization of the data transmission can be ensured and thereupon the access to the backup can take place. In this case, the backup can be stored in the first sensor and/or can be stored on a server and/or in a database in the cloud through a direct data connection and/or through corresponding parameterization tools. The sensor can create its parameterization information, for example, at regular intervals, or when changes are made to the device settings, as backup copies that are stored, for example, in an EEPROM or other non-volatile memory, so that the information is retained even when the battery is empty. The link communications processor or other logic circuit can access the memory while power is being supplied by the second sensor and transfer the data over the existing communications link. If the backup is stored in the cloud through a direct data link and/or through a parameterization tool, the second sensor can access it through another communication interface, for example, after verifying authorization. This can be done by a direct data connection, such as a mobile communication module in the sensor and/or via a communication device connected to the cloud, with which the sensor is connected e.g. via NFC, via Bluetooth or via cable.

According to one embodiment, the sensor parameterization has information on the measurement physics, cloud access data, data for assigning the first sensor to a measurement point and/or coupling information for operating devices, such as Bluetooth devices, smartphones or tablets. For the user, this makes it very easy to commission the new sensor. The cloud system does not have to be parameterized again. The new device replaces the previous one and is assigned to all measuring points of the previous device.

According to one embodiment, the first sensor has a first serial number and the second sensor has a second serial number. The first sensor is arranged to send the data via the communication link only if the first serial number and the second serial number have a relationship to each other. For example, to maintain security when copying the data, the serial number of the first sensor is first read by the second sensor, which sends the two numbers for verification via, for example, a cellular interface to a server that accesses the customer database. Only if both serial numbers are assigned to the same customer is the transmission of the data allowed, and the second sensor causes the first sensor to transmit the parameterization data. Alternatively, it can also be specified that the serial numbers match to a certain part or match according to a certain scheme. For example, a certain range of serial numbers is assigned to a customer. The serial number can, for example, be stored in a ROM, e.g. an EEPROM.

In the course of the serial number check using, for example, a mobile radio connection, it is also possible to check whether the second sensor is authorized to query the data from the first sensor. Furthermore, parameterization data can also be supplemented or updated as required.

In general, it should be noted that preferably both sensors are of the same or similar design, so that the second, i.e. new, sensor described here can, as soon as its battery is empty, slip into the role of a first, i.e. previous, sensor and transfer its device settings to another new sensor. In this way, the changeover can take place over several generations.

For example, it can be provided that the transmission of the device setting(s) and/or the sensor parameterization is carried out when a threshold value of an energy supply, such as a residual energy of a battery of the first sensor, is reached. In this case, the first sensor can be deactivated by the new (second) sensor after the transmission has been completed, so that the latter does not transmit any further measured values after the transmission. This can be advantageous in particular with regard to uninterrupted operation of the measuring point and/or enable uninterrupted operation.

According to a further embodiment, the first sensor and the second sensor are level sensors for measuring a level of a liquid, bulk material or other material, for example using radar or ultrasound.

According to one aspect, the sensor(s) is/are used for flow measurement, level limit measurement, pressure measurement, density measurement, or object detection as an alternative or in addition to level measurement. However, the uses are not limited to those mentioned. For example, the sensors can also be gas sensors or smoke detectors. A particularly advantageous use of the sensor device arises in mobile applications or variable environments where, for example, the installation location, customer data, data of the medium to be measured, etc. change.

Object detection can be, for example, the monitoring of a hazardous area of a machine by an infrared or radar sensor, where, for example, the machine is switched off if a person approaches the machine too far. In assembly line applications, for example, the sensor detects objects on the assembly line, e.g. for checking, counting or sorting.

According to a further aspect, there is provided a method for transmitting a sensor parameterization between sensors via a communication link, comprising the steps of:
Providing power necessary for communication link through the second sensor to a first sensor via the communication link,
Sending the sensor parameterization by the first sensor to the second sensor,
Receiving and accepting the sensor parameterization by the second sensor.

The sensor parameterization here has information on the measurement physics, cloud access data, data on the assignment of the first sensor to a measurement point and/or coupling information for operating devices.

In particular, the communication link here can be a wireless link, e.g. an NFC link, or a wired link. The step of sending the sensor parameterization can be preceded by an external triggering of the transmission, e.g. by receiving an external signal generated by a switch, a button, a reed contact, a Hall sensor on the sensor or by a Bluetooth device or a mobile radio device.

Furthermore, the step of sending the sensor parameterization can be preceded by a check of the serial number, so that the transmission is only started if the serial number fulfills a condition, such as belonging to the same customer.

Furthermore, the step of sending can be preceded by a verification of authorization, i.e. an authorization and/or an authentication.

According to one embodiment, a measured value transmission in the first sensor can be deactivated after the sensor parameterization has been accepted.

Further options and process steps correspond to and result from the embodiments described above.

Features, elements and/or functions of the sensor device as described above and below may be features, elements and/or steps of the method as described above and below, and vice versa.

According to a further aspect, a program element is provided that, when executed on a control unit such as a processor of a sensor, instructs the sensor to perform the steps of the method as described above and below.

The program element can be part of a computer program, but it can also be a whole program by itself.

According to a further aspect, there is provided a computer-readable medium on which a program element as described above is stored. The computer-readable medium may be considered a storage medium, such as a USB flash drive, a CD, a DVD, a data storage device, a hard drive, or any other medium on which a program element as described above may be stored.

Other variations of the disclosed embodiments may be understood and performed by those skilled in the art in carrying out the claimed invention by studying the drawings, the disclosure, and the appended claims. In the claims, the word "comprising" does not exclude other elements or steps, and the indefinite article "a" or "one" does not exclude a plurality. A single processor or other unit may perform the functions of multiple items or steps recited in the claims. The mere fact that certain actions are recited in interdependent claims does not mean that a combination of those actions cannot be advantageously used. A computer program may be stored/distributed on a suitable medium such as an optical storage medium or a semiconductor medium provided with or as part of other hardware, but may also be distributed in other forms, such as via the Internet or other wired or wireless telecommunications systems. Reference signs in the claims should not be construed to limit the scope of the claims.

In the following, embodiments of the present disclosure are described with reference to the figures.

BRIEF DESCRIPTION OF THE FIGURES

In the following, embodiments of the present disclosure are described in detail with reference to the accompanying figures. Neither the description nor the figures are to be construed as limiting the invention. Hereby shows FIG. 1 a sensor device according to an embodiment, and FIG. 2 a method according to an embodiment example.

The drawings are merely schematic and not to scale. In principle, identical or similar parts are given the same reference signs.

DETAILED DESCRIPTION OF THE FIGURES

Figure 1:
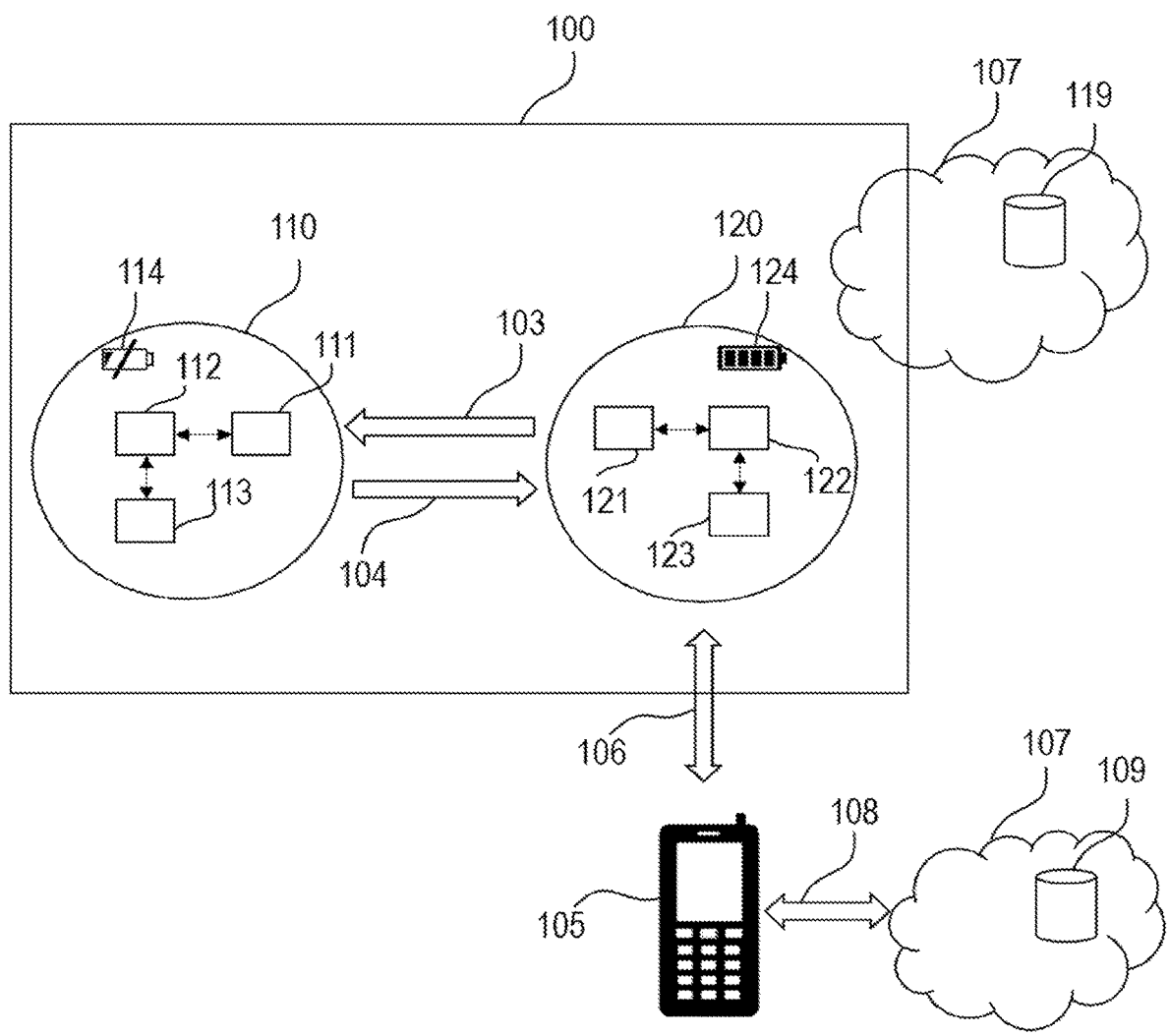

In a first embodiment, FIG. 1 shows a sensor device with a first, previous sensor 110 whose battery 114 is empty, has a certain threshold value of a charge state of the battery and/or a small amount of residual energy and therefore is to be replaced, and a second, new sensor 120 whose battery 124 is full and which is to replace the first sensor 110. The two sensors 110, 120 are in local proximity to each other so that the first sensor 110 can receive energy from the second sensor 120 in this example via the inductive portion 103 of the near field communication link 103, 104. In the sensor 110, the received energy activates the communication module 111 so that the processor 112 can read parameterization data, such as measurement physics information, cloud access data, data for assigning the first sensor to a measurement location, and/or coupling information for operating devices from the memory 113. The communication module 111 sends the read-out data to the communication module 121 of the second sensor 120 via the data link portion 104 of the near-field communication link 103, 104. Processor 112 stores the data in the memory 123 and configures the second sensor 120 accordingly so that it is immediately ready for operation.

In the example shown in FIG. 1, the sensor 120 is connected to a cloud 107 via the smartphone 105, which is capable of communicating via a cellular standard, allowing access to a customer database 109 and/or a database 119 for measurement data and sensor data. Both the smartphone 105 and sensor 120 are also Bluetooth enabled. An operator of the smartphone can initiate data transfer of the parameterization data via the Bluetooth connection 106 using an application. The cellular connection 108 can be used to verify that the first sensor 110 and the second sensor 120 are assigned to the same customer, and that the second sensor 120 is authorized to accept the data from the first sensor 110. This can ensure that the data is retrieved from the sensor 110 to be replaced and not, for example, a third sensor, and, secondly, prevents unauthorized data retrieval by sensor 120.

At least parts of the data can also be supplemented, modified and checked by the customer database 109 or the database 119. Once the authorization of the sensor 120 has been determined as positive, the sensor can now, for example, get the access data to the cloud, which allows it to directly access the database 119, from which it can get further parameterization data. For example, this may be parameterization data stored in a backup file in the database or a server. Alternatively, the database 119 or the backup file can also be accessed via the mobile device after the authorization has been successfully checked.

From the above description it can be seen that further variations in the process and constellation are possible.

One application is fill level sensors on mobile tanks. These monitor the fill level at regular defined or variable time intervals and send this to a cloud 107. This cloud 107 interprets the fill level information from the sensor 110 and assigns it to the respective silo. At the end of the battery life, a new sensor 120 is to be mounted on the silo and take over the parameterization of the previous sensor 110.

Figure 2:
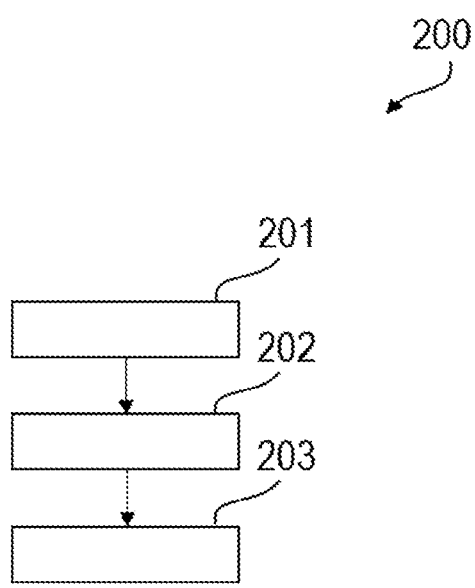

FIG. 2 shows a method 200 for transmitting a sensor parameterization between sensors via a communication link 103, 104 according to one embodiment. First, in step 201, energy is provided that is necessary for communication link 103, 104. This is done via communication link 103, 104, e.g., NFC, with inductive energy transmission 103, by second sensor 120 to a first sensor 110. Thereupon, in step 202, first sensor 110 transmits sensor parameterization to second sensor 120. Finally, in step 203, second sensor 120 receives and accepts sensor parameterization.

Optionally, in step 203 (or in another optional step), the second sensor 120 may deactivate the measured value transmission in the first sensor 110, such as by transmitting a corresponding control signal and/or signal to the second sensor 120, thereby avoiding a collision of the measured value transmission from the first and second sensors 110, 120 in the event of any residual energy in the battery of the first sensor 110.

This provides an inexpensive, simple and easy solution for replacing a previous sensor with a new sensor by placing it in the vicinity of the previous sensor. The parameterization data is transferred automatically. Optionally, an external trigger can initiate the transmission. The energy required for this is provided by the new sensor.

It should be noted in addition that "comprising" and "having" do not exclude other elements or steps, and the indefinite articles "an" or "a" do not exclude a plurality.

The invention claimed is:

1. A sensor device for transmitting a sensor parameterization data between sensors, comprising:
   a first sensor having a sensor parameterization data, which is a parameterization of the first sensor; and
   a second sensor;
   wherein the first sensor and the second sensor are configured to communicate with each other directly via a communication link,
   wherein the first sensor is configured to send the sensor parameterization data of the first sensor to the second sensor via the communication link,
   wherein the second sensor is configured to receive and accept the sensor parameterization data of the first sensor,
   wherein in response to receiving and accepting the sensor parameterization data of the first sensor, storing the sensor parameterization data on the second sensor and configuring the second sensor for operation,
   wherein the second sensor is further configured to provide the first sensor with a power necessary to transmit the sensor parameterization data of the first sensor via the communication link, and
   wherein the second sensor is to replace the first sensor after transmission and acceptance of the sensor parameterization data.

2. The sensor device according to claim 1, wherein the communication link is a near field communication (NFC) link.

3. The sensor device according to claim 1, wherein the communication link is a wired link.

4. The sensor device according to claim 1, wherein the first sensor and the second sensor are configured to act both as master and slave.

5. The sensor device according to claim 1, wherein the second sensor is configured to receive a signal to start transmission.

6. The sensor device according to claim 5, wherein the signal to start the transmission is generated by a button, a reed contact, a Hall sensor, a Bluetooth device, and/or a cellular device.

7. The sensor device according to claim 1, wherein the sensor parameterization data further includes information on measurement physics, cloud access data, data for assigning the first sensor to a measurement point, and/or coupling information for operating devices.

8. The sensor device according to claim 1, wherein
   the first sensor has a first serial number and the second sensor has a second serial number,
   wherein the first sensor is configured to transmit data over the communication link only when the first serial number and the second serial number are related, and
   wherein the first serial number and the second serial number are related by representing a common customer or by being a partial match.

9. The sensor device according to claim 1, wherein the first sensor is further configured to provide parameterization information from a backup.

10. The sensor device according to claim 1, wherein the first sensor and the second sensor are level sensors.

11. A sensor for a sensor device transmitting a sensor parameterization data between sensors, the sensor device comprising:
    a first sensor having a sensor parameterization data, which is a parameterization of the first sensor; and
    a second sensor;
    wherein the first sensor and the second sensor are configured to communicate with each other directly via a communication link,
    wherein the first sensor is configured to send the sensor parameterization data of the first sensor to the second sensor via the communication link,
    wherein the second sensor is configured to receive and accept the sensor parameterization data of the first sensor,
    wherein in response to receiving and accepting the sensor parameterization data of the first sensor, storing the sensor parameterization data on the second sensor and configuring the second sensor for operation,
    wherein the second sensor is further configured to provide the first sensor with a power necessary to transmit the sensor parameterization data of the first sensor via the communication link, and
    wherein the second sensor is to replace the first sensor after transmission and acceptance of the sensor parameterization data.

12. The sensor according to claim 11, wherein the sensor is configured for level measurement, flow measurement, level limit measurement, pressure measurement, density measurement or object detection.

13. A method for transmitting a sensor parameterization data between sensors over a direct communication link between a second sensor and a first sensor, comprising:
    providing to the first sensor by the second sensor a power necessary to transmit the sensor parametrization data of the first sensor via the communication link;
    sending the sensor parameterization data by the first sensor to the second sensor, wherein the sensor parametrization data is a parameterization of the first sensor;
    receiving and accepting the sensor parameterization data of the first sensor by the second sensor; and
    in response to the receiving and accepting the sensor parameterization data of the first sensor, storing the sensor parameterization data on the second sensor and configuring the second sensor for operation, wherein the second sensor is to replace the first sensor after transmission and acceptance of the sensor parameterization data.

14. The method according to claim 13, further comprising, after the sensor parameterization data has been accepted, deactivating a measured value transmission in the first sensor.

15. A non-transitory computer-readable medium on which is stored a program that when executed by a computer causes the computer to implement the method according to claim 13.

* * * * *